Aug. 3, 1954 C. E. LANSIL 2,685,612

SYNCHRONIZING APPARATUS

Filed March 7, 1952 5 Sheets-Sheet 1

INVENTOR.
CLIFFORD E. LANSIL
BY Kenway Jenney Witter & Hildreth
ATTORNEYS

Aug. 3, 1954 C. E. LANSIL 2,685,612

SYNCHRONIZING APPARATUS

Filed March 7, 1952 5 Sheets-Sheet 2

INVENTOR.
CLIFFORD E. LANSIL
BY Kenway Jenney Witter & Hildreth
ATTORNEYS

INVENTOR.
CLIFFORD E. LANSIL
BY Keneway Jenney Witter & Hildreth
ATTORNEYS

INVENTOR.
CLIFFORD E. LANSIL
BY Kenway Jenney Witter & Hildreth
ATTORNEYS

Aug. 3, 1954 C. E. LANSIL 2,685,612

SYNCHRONIZING APPARATUS

Filed March 7, 1952 5 Sheets-Sheet 5

INVENTOR.
CLIFFORD E. LANSIL
BY Kenway, Jenney, Witter & Hildreth
ATTORNEYS

Patented Aug. 3, 1954 2,685,612

UNITED STATES PATENT OFFICE 2,685,612

SYNCHRONIZING APPARATUS

Clifford E. Lansil, Arlington, Mass., assignor to The Gamewell Company, Newton Upper Falls, Mass., a corporation of Massachusetts Application March 7, 1952, Serial No. 275,328

11 Claims. (Cl. 178—69.5)

Figure 1:
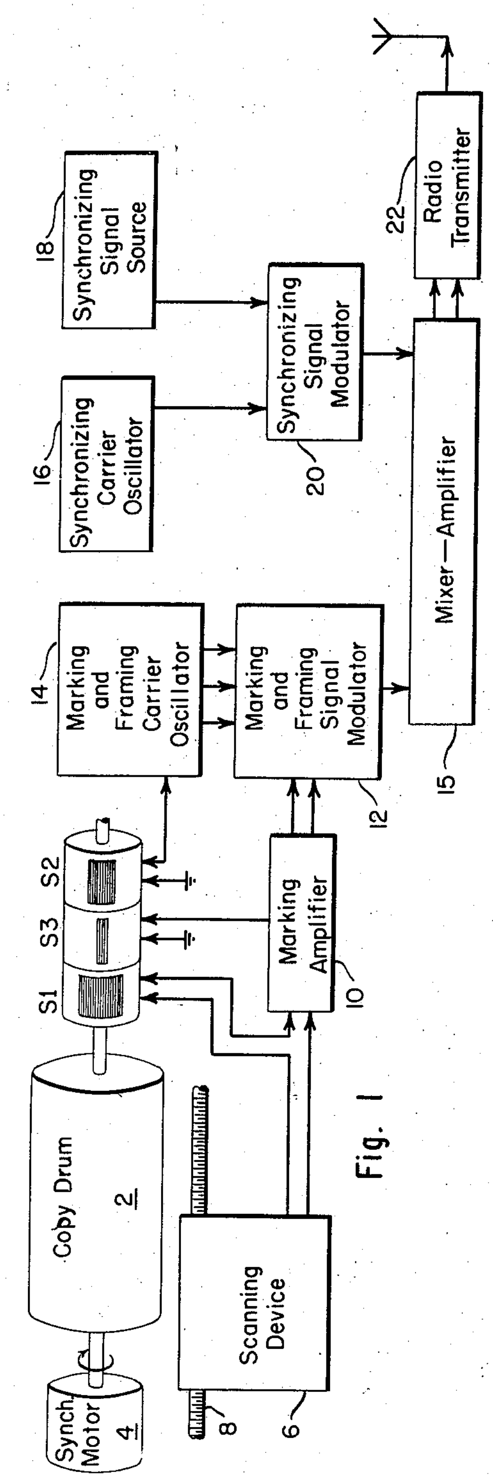

The present invention relates to synchronizing apparatus and more particularly to a vibrator power supply having an externally-controlled frequency of vibration. Such a power supply is suitable for use in the receiver of a facsimile transmission system. A description of a complete system incorporating the invention is given in the copending application of Weld, Serial No. 235,793, filed July 9, 1951.

The basic elements in a facsimile apparatus utilizing this invention include two drums, rotated continuously and in synchronism, one being located at the transmitter and the other at the receiver. The original matter to be transmitted, which may be words, pictures, or other marks composed upon a sheet, is wrapped upon the drum at the transmitting end. A photoelectric device located near this drum scans the matter and produces electrical variations in a circuit connected with the transmitter. The drum located at the receiver bears a helical raised portion or rib which cooperates with a print bar actuated by the receiver to cause marks to be transferred by pressure from a sheet of carbon paper onto an adjacent sheet of paper, the result of which is to produce on the latter sheet a facsimile reproduction of the original matter. This basic technique is well-known in the communications art, and has been described in many patents, including, for example, the patent to Artzt, No. 2,326,740.

The proper functioning of the apparatus, aside from the transmission of the electrical variations produced in the photoelectric scanning device, imposes two conditions upon the rotation of the drums. First, the drums must be rotated in synchronism, that is, the rotational speeds must be the same, and second, assuming that for each drum there is a fixed reference position from which to measure its instantaneous angular displacement, the drums must be rotated so that a particular displacement of one drum always corresponds with a particular displacement of the other drum. The present invention is principally concerned with synchronizing, which is the process by which compliance with the first condition is achieved. The term "framing" is applied to the process by which compliance with the second condition is achieved.

As for synchronizing, the simplest technique, where a common alternating current power source is available at both transmitter and receiver, is to rotate the drums by synchronous motors connected to the source.

Where a common alternating current power source is not available, it is well-known that either of two techniques, or a combination of both, may be used.

By one of these techniques each drum is rotated by a synchronous motor supplied from a local source of alternating electrical potential the frequency of which is governed by a standard which has been pretuned, either electrically or mechanically, to oscillate or vibrate at the same frequency as the other standard. In this case the frequency is not transmitted, and reliance is placed upon the precision of pretuning as well as upon the capacity of the standards to retain their tuned conditions over a length of time and with varying periods and conditions of use.

By the other technique a small amount of energy, derived from an alternating current source driving a synchronous motor at the transmitter, is transmitted to the receiver. The receiver is provided with a power amplifier the frequency of which is governed by the transmitted frequency. The power amplifier drives the synchronous motor at the receiver.

A feature of the described apparatus incorporating the present invention includes synchronizing means which may be classified under both of the two last-mentioned techniques. However, a "frequency standard," as that term is normally employed, is not required.

A principal object of the present invention is to provide synchronizing apparatus adapted to receive a signal of given frequency and to control a local power supply at the received frequency.

Another object is to provide a vibrator power supply having a natural frequency of vibration in the neighborhood of the received frequency, and means whereby the received frequency controls the actual frequency of the vibrator.

Another object is to provide a vibrator power supply of the above type which is adapted for use in a facsimile receiving system to supply power for rotating the receiver drum in synchronism with the transmitter drum.

With the above objects in view a feature of the invention includes the combination of a vibrator power supply with a synchronizing transformer connected in series with the vibrator coil, and means for energizing the transformer at the received frequency.

Another feature is the combination of a synchronizing transformer as above described with a tube for amplifying the received frequency, the tube having as its plate supply the alternating output voltage of the vibrator circuit.

Other features of the invention include certain novel circuits, arrangements, combinations and adaptations as described in the specification and particularly defined in the claims.

Figure 3:
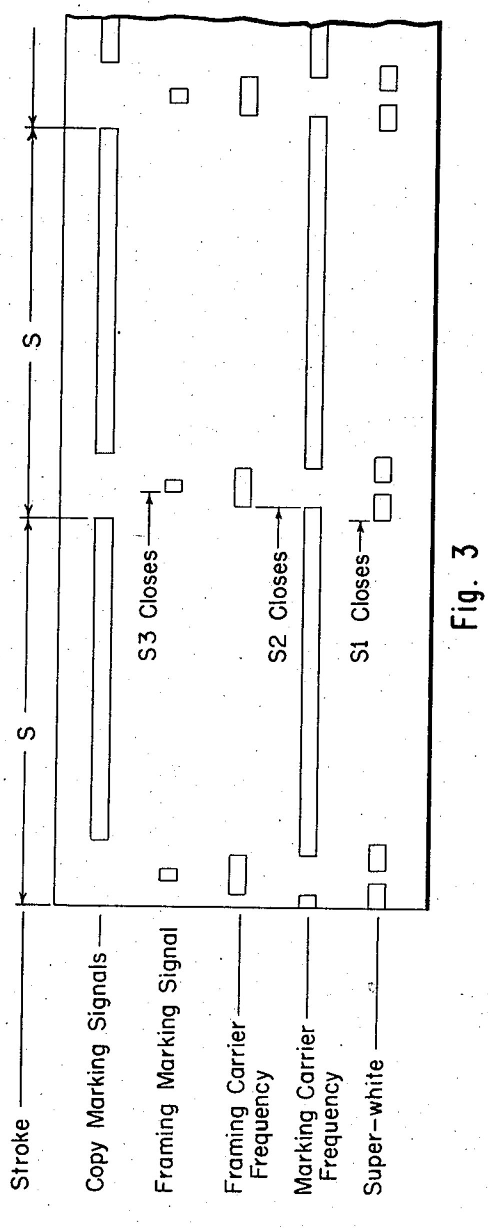
Figure 2:
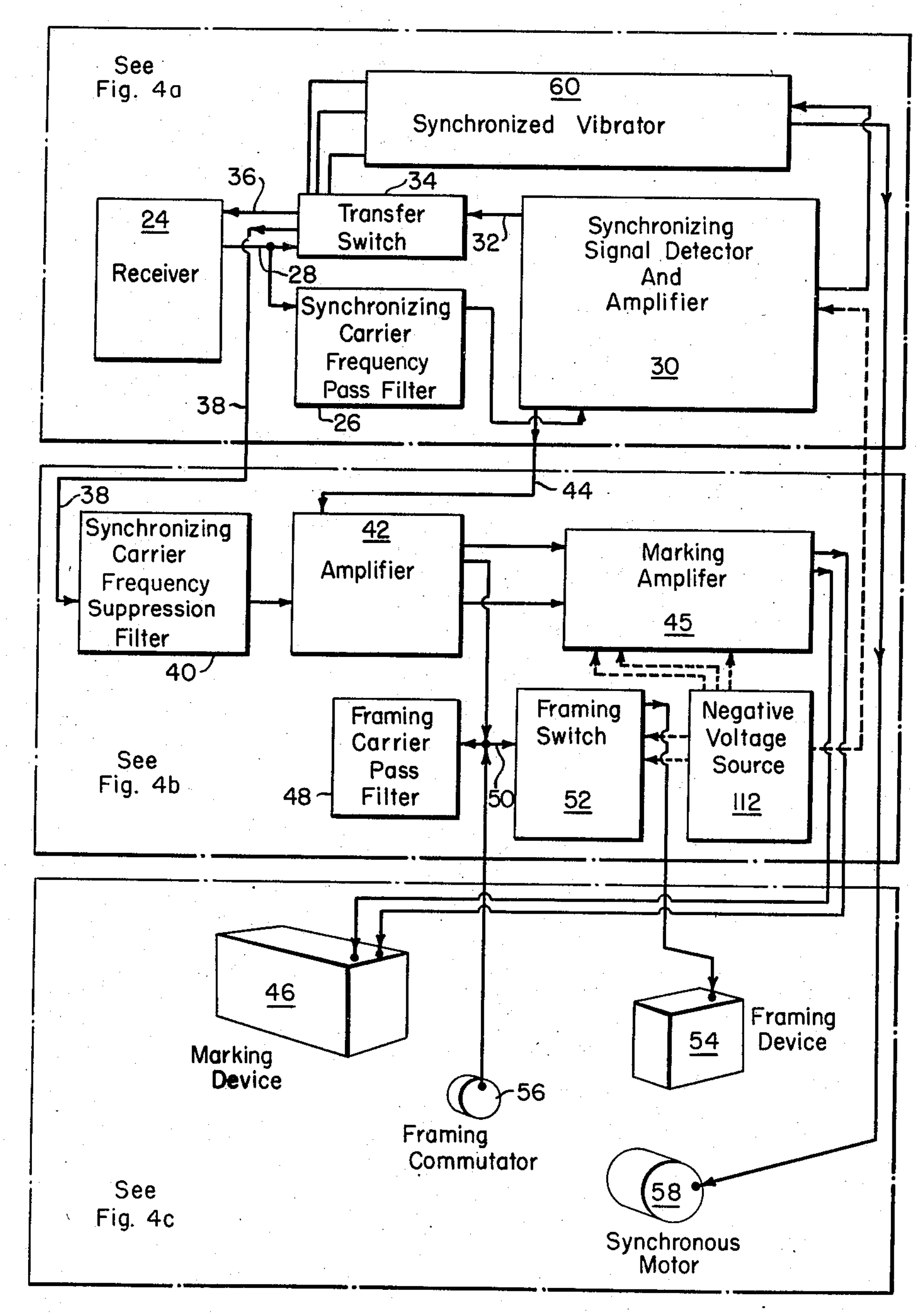

In the drawings, Fig. 1 is a block diagram of the facsimile transmitter; Fig. 2 is a block diagram of the facsimile receiver; Fig. 3 is a signal timing diagram; and Figs. *4a*, *4b*, and *4c* (adapted for use together as one drawing) show the schematic circuit diagram of the facsimile receiver.

*Block diagram.—Transmitter*

Fig. 1 is a block diagram of the facsimile transmitter. A copy drum 2 is fixed upon a shaft driven by a synchronous motor 4. Also fixed to the shaft is a set of framing commutators S1, S2 and S3. Each commutator is swept by a pair of brushes the functions of which are hereinafter more fully described.

A probe or scanning device is mounted upon a lead screw 8 parallel to the axis of the copy drum. A light source in the probe projects a spot of light having a diameter of $\frac{1}{100}$ inch upon the drum. A photoelectric device within the probe is provided with means for detecting the quantity of light reflected from the spot. The lead screw 8 is coupled through appropriate gearing to the motor 4, which causes the spot to trace a helical path over the surface of the drum.

The original matter to be transmitted, for example a picture, is wrapped upon the drum with either the horizontal or vertical dimension parallel to the axis of the drum. One margin of the matter parallel to the axis is located in a definite relation to the positions of the commutators S1, S2 and S3. For example, assuming that the left-hand vertical margin of the original matter is made parallel to the drum axis, the position of the commutators may be adjusted so that the spot moves through this margin space during the interval in which one or more of the commutators are in contact with their respective brushes.

The probe 6 is connected to a marking amplifier 10, which in turn is connected with a marking and framing signal modulator 12. The modulator 12 causes the signal from the amplifier 10 to modulate a marking carrier frequency, which may be of the order of 3000 cycles per second, supplied by a marking and framing carrier oscillator 14. As hereinafter explained, this oscillator is controlled by a commutator to produce alternatively a framing carrier frequency, which may be of the order of 2000 cycles per second, but this frequency is not used for modulating the signal from the amplifier 10.

The moduator 12 is connected with a mixer-amplifier 15. The function of the mixer-amplifier is to mix the modulated marking carrier frequency with a synchronizing carrier frequency, which may be of the order of 4000 cycles per second, and which is modulated by a synchronizing signal of constant amplitude, which may be of the order of 60 cycles per second. The synchronizing carrier frequency is produced by a synchronizing carrier oscillator 16; the synchronizing signal is produced by a synchronizing signal source 18 which also suplies the motor 4; and the modulation of the synchronizing carrier frequency is brought about by a synchronizing signal modulator 20.

The mixer-amplifier 15 is shown connected with a radio transmitter 22. However, the transmitter may be replaced by means adapted for wire transmission of the complex wave composed in the manner described above.

The function of the commutators S1, S2 and S3 may best be seen by reference to Fig. 3. This is a timing diagram, depicting two complete strokes S, each stroke representing one period of revolution of the copy drum.

It will be seen that each stroke begins at the instant that the commutator S1 connects its brushes. Through the connection of these brushes to the probe 6 and to the marking amplifier 10, the signals previously induced in the probe are interrupted at this moment and the marking amplifier receives a steady signal corresponding to a signal received from the probe while reading a white spot. This is termed a "super-white" signal.

It will thus be observed that for a brief period between the connection of the brushes at the commutator S1 and the connection of the brushes at S2, the net effect upon the output signal at the transmitter will be to produce the equivalent of a clear white margin, irrespective of the nature of the original matter on the copy drum which is then being scanned by the probe.

Upon the connection of the brushes at the commutator S2 a connection to the marking and framing carrier oscillator 14 is grounded. This changes the frequency of the oscillator from that of the marking carrier frequency to that of the framing carrier frequency. As indicated by Fig. 3, there is no change at this time in the input to the marking amplifier 10 and thus the modulator modulates a "super-white" signal upon the framing carrier frequency.

Upon the connection of the brushes at the commutator S3 a connection to the marking amplifier 10 is grounded. This produces a net change in the input to the amplifier and causes it to receive a steady signal corresponding to a signal received from the probe while reading an exceedingly black spot. This is termed a "super-black" signal, or framing marking signal. This signal modulates the framing carrier frequency.

The succession of events after the closure of the brushes at S3 is the exact reverse of that described above. As shown in Fig. 3, the commutators are symmetrically arranged to produce this result. The elapsed time during which one or more of the commutators connect their respective brushes may be of the order of one-sixth of each stroke in an embodiment such as that described.

Thus, in addition to the transmission of marking signals from the probe, the transmitter produces, once per revolution and during the period that the probe scans a margin of the original matter, a set of signals which may be used at the receiving end for framing purposes. It will be noted that the modulated synchronizing carrier signal continues uninterrupted at all times during the transmission.

*Block diagram.—Receiver*

Fig. 2 is a block diagram of the facsimile receiver, assuming as above that the transmitted signal emanates from a radio transmitter. Accordingly, a radio receiver 24 receives the signal and demodulates it to the form in which it entered the radio transmitter. For purposes of illustration, it may further be assumed that the entire facsimile receiver is located in an automotive vehicle and specifically that the receiver 24 is a conventional voice radio receiver.

Assuming first that no waves emanate from the facsimile transmitter, the facsimile receiver will be in an initial condition referred to herein as the "stand-by condition." In this condition the receiver 24 operates for normal voice reception. This condition is produced by a relay connection in the following manner. A synchronizing carrier frequency pass filter 26 which is connected to the receiver 24 over a lead 28 is connected with a synchronizing signal detector and amplifier 30. If there is present in the lead 28 a modulated synchronizing carrier frequency, the modulating frequency is demodulated, amplified, and connected over a lead 32 to energize a transfer switch 34. This switch, when not energized by this signal, connects the lead 28 to a lead 36 connected with the receiver 24, and thus completes a circuit to the speaker of the receiver.

Assuming next that a signal is received from the facsimile transmitter, the facsimile receiver is brought into a condition, referred to herein as the "operating condition," by the transfer switch 34, which becomes energized and continues in the energized condition as long as the modulated synchronizing carrier frequency appears in the lead 28. When the switch is in the energized condition the lead 28 is switched from the lead 36 to a lead 38 connected with a synchronizing carrier frequency suppression filter 40. The function of this filter is to eliminate the synchronizing carrier frequency while passing a substantial amount of each of the other carrier frequencies, namely the framing and marking carrier signals, one or the other of which will also be present in the lead 38. For example, assuming as above that the synchronizing carrier is at 4000 cycles per second, and the framing and marking carriers are at 2000 and 3000 cycles per second, respectively, the filter 40 is substantially a low-pass filter tuned to suppress frequencies of 4000 cycles per second and above.

The output of the filter 40 is connected with an amplifier 42. This amplifier is provided with automatic volume control by a lead 44 from the detecting element in the synchronizing signal detector and amplifier 30. Thus, the automatic volume control level is determined by the level of the detected synchronizing signal.

The output of the amplifier 42 is two-fold. One connection is with a marking amplifier 45 which is in turn connected with a marking device 46. This device produces the facsimile copy. A second connection is through a framing carrier pass filter 48 and a lead 50 to a framing switch 52. The switch 52 is normally in the unenergized condition. It becomes energized upon the appearance of a framing carrier signal in the lead 50, thus operating a framing device 54. This device operates in a manner hereinafter more fully described to frame the copy, that is, to produce the required correspondence between the instantaneous displacements of the drums at the transmitter and receiver. The operation of the framing device may be, and normally is, suppressed by a connection between a framing commutator 56, mounted coaxially with the drum at the receiver, and the filter 48. It is only when the copy is out of frame that the framing switch 52 is brought into operation.

The drum at the receiver is driven by a synchronous motor 58 having as a source of energy a synchronized vibrator 60 which forms the subject of the present invention. This is a reed vibrator similar in some respects to vibrators in conventional automobile receivers. The natural frequency of the vibrator is in the neighborhood of the synchronizing signal frequency. However, through a connection from the synchronizing signal detector and amplifier 30 the vibrator is caused to operate in exact synchronism with the transmitted synchronizing signal. Thus, once the framing device has operated after the facsimile receiver has been brought into the operating condition, in the absence of aberrations in the received signal, the synchronous motor 58 keeps the drums in synchronism and properly framed without further operation of the framing device.

*Circuit diagram.—Receiver*

Figure 4A:
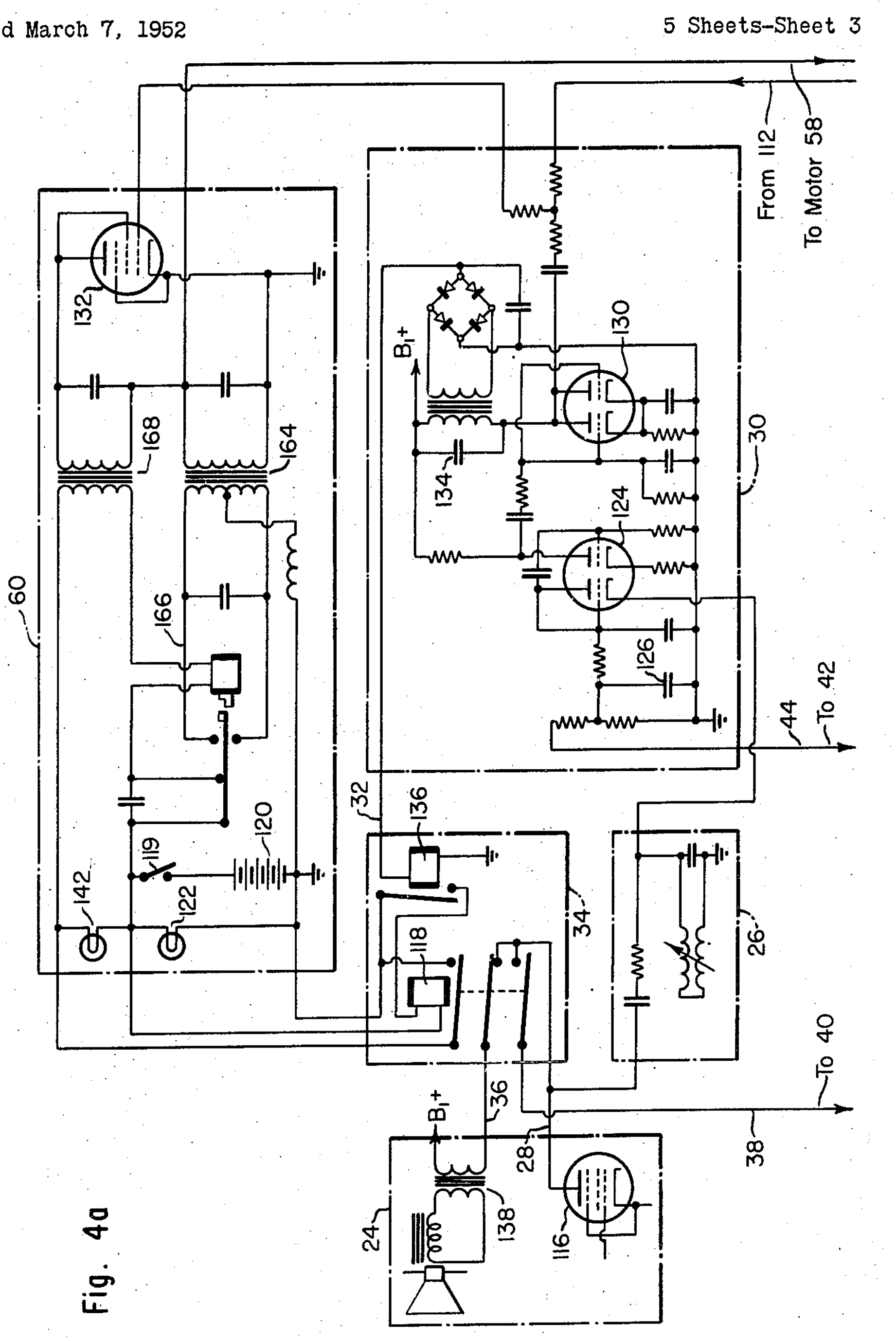
Figure 4B:
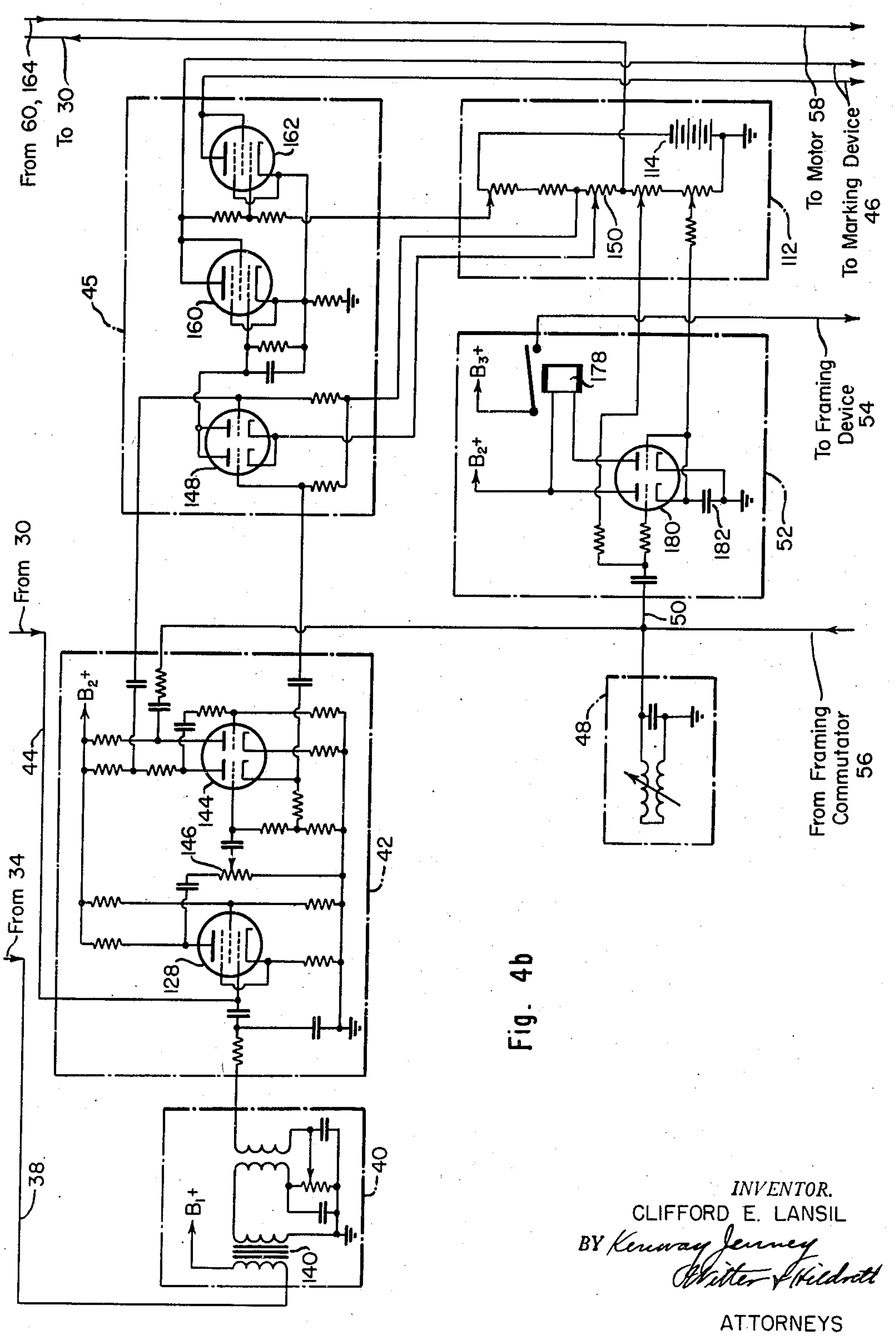
Figure 4C:
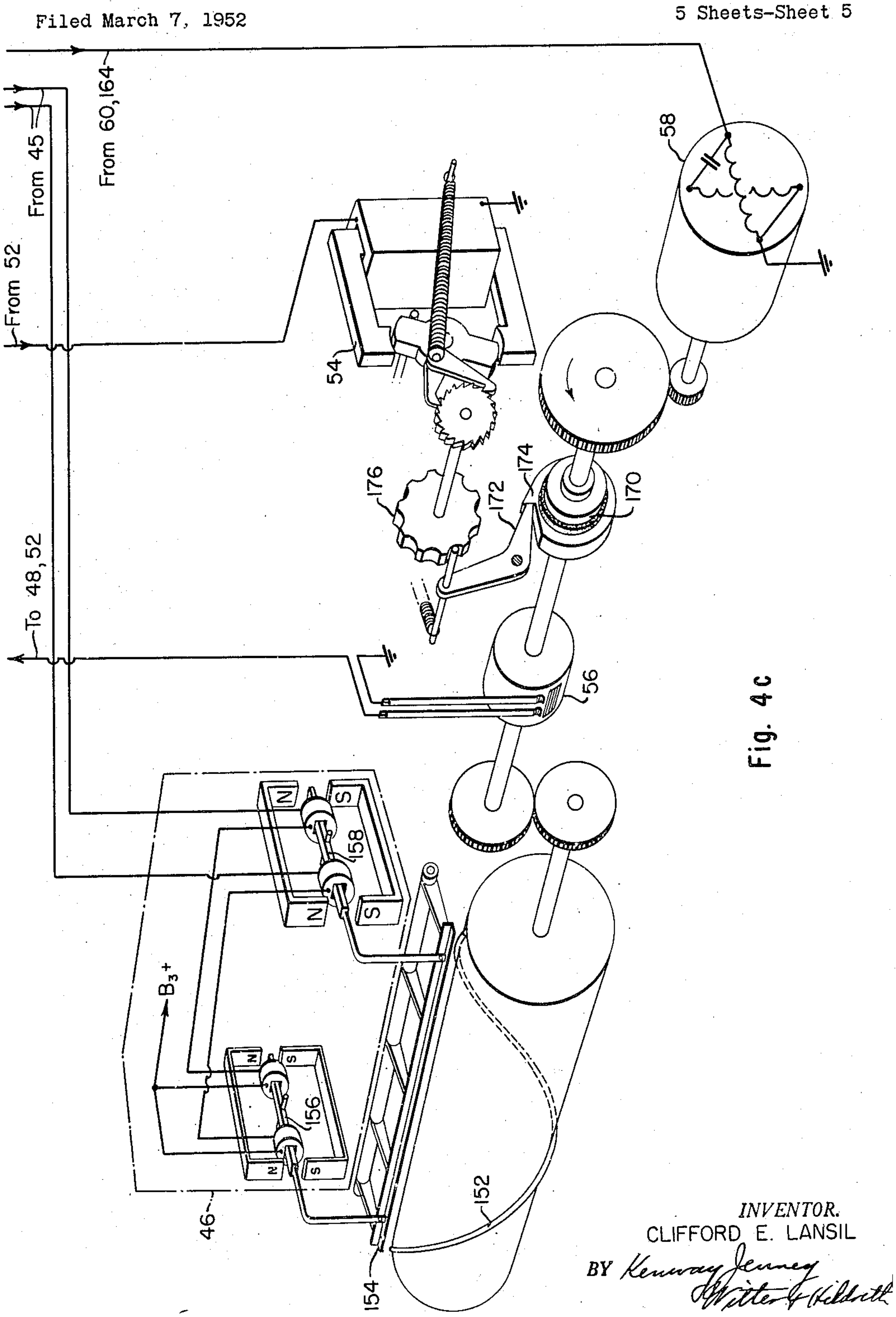

Figs. 4*a*, 4*b* and 4*c*, which are adapted to form a signal sheet of drawing when arranged alphabetically from top to bottom, show a circuit diagram of the facsimile receiver. It is assumed in this diagram that the filaments of all tubes are supplied by an appropriate source. In the case of a mobile receiver installation this is preferably a direct current source. There are three B+ voltage sources, designated as $B_1+$, $B_2+$ and $B_3+$, respectively. There is also a source of negative voltage 112 shown schematically as supplied by a battery 114. The dash-dot lines correspond to the outlines of the various blocks in Fig. 2.

As indicated above, the facsimile receiver is coupled to the output stage of the conventional voice radio receiver 24 (Fig. 4*a*). This connection is such that the plate supply to the output tube, which may be a pentode 116, is connected through normally closed contacts of a transfer relay 118. The plate supply $B_1+$ is the power supply for the output stage of the voice receiver.

Assuming that the facsimile receiver is to be put into operation, a switch 119 is closed. This connects a direct current power source 120 across a "standby" lamp 122. This lamp remains lighted at all times while the receiver is in condition for receiving facsimile signals.

All signals present at the plate of the radio receiver output tube 116 are also present at the inputs to the transfer switch 34 and the synchronizing carrier frequency pass filter 26 through the lead 28. The filter 26 is anti-resonant and responds to a narrow band of frequencies centering around the synchronizing carrier frequency. The filter output is applied to one-half of a tube 124, connected as a diode and operating as a demodulator or detector.

The detected signal has a direct-current component and an alternating component having the synchronizing signal frequency. The direct-current component is sufficiently filtered by a capacitor 126 to be used for automatic volume control of an amplifier tube 128 (Fig. 4*b*). The alternating component is applied to the grid of the amplifier half of the tube 124 (Fig. 4*a*). This amplified output is then coupled through a low pass filter to a second amplifier tube 130, which is a double triode with its elements connected in parallel. A portion of the output voltage of this tube is applied to the grid of a synchronizing tube 132, hereinafter more fully described. The tube 130 also has a transformer coupled output, the secondary voltage being bridge-rectified. The transformer is partially resonated at the synchronizing frequency by a capacitor 134 in parallel with its primary. If there is a synchronizing signal frequency present at the grids of the tube 130 there is a resultant rectified voltage on the lead 32 and a signal relay 136 is energized. This in turn energizes the transfer relay 118.

It will be noted that the plate supply for both of the tubes 124 and 130 is indicated as identical with that of the radio receiver output tube 116.

However, this does not represent a serious drain upon the supply, since the current can be kept below 4 milliamperes by proper designing.

When the transfer relay 118 becomes energized, its contacts operate first to parallel the primary of the radio receiver output transformer 138 with the primary of the facsimile receiver input transformer 140 (Fig. 4b). The plate connection of the radio receiver output transformer is then disconnected. This substitutes the transformer 140 for the transformer 138, silencing the radio loudspeaker. A third pair of contacts on the relay 118 connect the battery 120 across an "operating" lamp 142. This lamp remains lighted at all times while the receiver is actually receiving a facsimile transmission.

The output of the transformer 140 passes through the synchronizing carrier frequency suppression filter 40, which may also be termed a point suppression filter (Fig. 4b). As already indicated, this filter removes the synchronizing carrier frequency and greatly reduces all higher frequencies. It is assumed that the marking and framing carrier frequencies are below the synchronizing carrier frequency. These are only slightly suppressed by the filter 40.

The filtered signal is then coupled to the pentode amplifier tube 128, which also operates as an automatic volume control, receiving its control bias from the rectified output of the tube 124, mentioned above. The output of the tube 128 is coupled to the grid of one half of a tube 144 through a framing and marking amplitude control 146. This half of the tube 144 acts as an impedance match and phase inverter for the marking amplifier 45, and also as a second stage amplifier for the framing switch 52. Its plate output is coupled to the grid of the second half of the tube 144, which is a third stage amplifier for the framing switch, and is also connected to the grid of one half of a tube 148.

The second grid of the tube 148 is fed from the cathode of the first half of the tube 144. Thus, the tube 148 is connected to operate as a full wave plate rectifier with adjustable threshold cutoff. In the absence of a signal from the tube 144 the cathode bias of this tube is adjusted to complete cutoff by a potentiometer 150.

Turning to Fig. 4c, marking at the recorder occurs when a wiping pressure is applied by a rotating helix 152 through parallel sheets of carbon and white paper, slowly passing through the recorder, against a print bar 154 when the latter is in its forward position.

The print bar driving head consists of two armatures 156 and 158 attached to the print bar and located in a permanent magnetic field. The permanent magnet inducing this field is not shown, but the polarity which it induces in the poles opposite to these armatures is indicated by the symbols N and S in the drawing. The motion of the armatures is determined by the excitation of the driving coils surrounding them. Referring to Fig. 4b, one pair of driving coils is excited when a tube 160, which may be referred to as the "white" tube, conducts. They cause the armatures to move the print bar away from the rotating helix. A second pair of driving coils is excited when a tube 162, which may be referred to as the "black" tube, conducts. They cause the armatures to move the print bar into its forward position where it is "wiped" by the rotating helix, marking the copy.

The functioning of the tubes 160 and 162 is controlled by the operation of the tube 148. A signal greater than the cutoff amplitude of the tube 148 will cause it to conduct, producing a negative bias on the grid of the "white" tube 160, causing it to cut off. The resulting increase in the plate voltage of the tube 160 is applied to the grid of the "black" tube 162, through a balancing network, greatly increasing its conduction.

The helix 152 is rotated by the synchronous motor 58, which is supplied with alternating current from the secondary winding of a vibrator transformer 164 (Fig. 4a). This transformer is energized by a vibrator 166. In practice, the secondary winding is also preferably connected through rectifiers to supply the voltages $B_2+$ and $B_3+$, and also to supply the voltages represented by the battery 114, but such circuits are conventional and are not shown.

Synchronizing is accomplished by continually adjusting the effective driving force acting upon the reed of the vibrator (Fig. 4a). This is done by means of the synchronizing tube 132. The plate circuit of this tube is connected in series with both the primary of a synchronizing transformer 168 and the output of the vibrator transformer 164. The grid is actuated by the synchronizing signal supplied by the output of the tube 130, mentioned above. The secondary of the transformer 168 is in series with the vibrator coil and the battery supply 120.

Conduction of the tube 132 may occur throughout the positive one-half cycle of the applied plate voltage. The magnitude of the current depends upon the phase relation between the plate voltage and the synchronizing signal applied to the grid. As a result of the rectifying acion of the tube 132 and of the vibrator contacts, a pulsating voltage results, which, when connections are properly made with respect to polarity, alters the driving force on the reed. This provides the required frequency correction, and has been found in practice to maintain the correction over a considerable range of battery voltage.

In order for the vibrator to respond properly to the synchronizing signal, its natural frequency is adjusted to be a fraction of a cycle higher or lower than the synchronizing signal frequency.

Turning now to Fig. 4c, the motor 58 drives the helix 152 through a friction clutch 170. When a clutch locking lever 172 is moved forward, an ear 174 on the clutch disk engages it, stopping the rotation of the helix drum so that the left end of the helix is opposite the print bar. It will be noted, therefore, that the ear 174 must be positioned in relation to the helix 152 so that the helix will stop in the position just indicated when the clutch disk is engaged.

While the clutch is engaged by the lever 172 the motor 58 continues to rotate at its synchronous speed and the friction drive slips at the clutch face. When the locking lever is disengaged the helix drum resumes its constant synchronous speed.

The action of the locking lever 172 is controlled by a cam 176 which is driven by strokes of the framing device 54 through a pawl-ratchet assembly. The cam alternatively advances and retracts the locking lever with successive strokes of the impulse magnet.

The impulse magnet is energized by the output of the framing switch 52 of the receiver (Fig. 4b), through contacts of a framing signal relay 178. The framing switch 52 receives its signals from the plate of the second half of the tube 144, mentioned above.

The sharply tuned anti-resonant framing carrier pass filter 48 discriminates against the marking carrier frequency. The output of the filter is coupled to one-half of a tube 180 which operates as a cathode follower type of grid rectifier. The grid of the other half of the tube 180 is connected to the cathode of the first half. The framing signal relay 178 is connected in series with the plate circuit of the second half of the tube 180. A condenser 182 in the cathode circuit of the detector half of the tube 180 holds the tube conducting for a sufficient length of time to ensure operation of the relay 178.

So long as the system is properly framed the framing pulse is suppressed by the commutator 56 (Fig. 4c) which closes contacts to ground these pulses as they appear at the input to the filter 48. When the recorder is out of frame, the commutator contacts will close out of synchronism with a framing pulse, allowing the pulse to enter the framing switch 52 over the lead 50. This causes the operation of the impulse magnet 54 through the operation of the framing signal relay 178. The locking lever 172, normally disengaged, is advanced, thereby stopping the clutch plate, the helix and the commutator. In this arrested position the contacts of the commutator are not closed, so that the succeeding framing pulse will be transmitted over the lead 50, and the impulse magnet will again be operated, retracting the locking lever through the cam action. This latter movement releases the clutch, allowing the friction coupling to drive the helix at the synchronous speed in a framed position. The whole framing operation takes place in two cycles of the framing pulse, which is two strokes of the drum in the transmitter.

Thus, it will be noted that the commutator 56 must be positioned in relation to the helix 152 so that two conditions are fulfilled: When the rotation of the helix is stopped the commutator must not be in contact with its brushes, and when the second framing pulse reengages the clutch the commutator will thereafter be in contact with its brushes when the third and successive framing pulses appear at the input to the filter 48.

While the present invention has been described with reference to a specific form of apparatus to which it may be conveniently adapted, it will be evident that its scope and utility are not restricted thereto. For example, certain minor variations may suggest themselves to persons skilled in this art, and such changes would not constitute a departure from the scope of the invention.

Having thus described my invention, I claim:

1. In a receiver for facsimile transmissions, the combination of a drum bearing a helical rib, a print bar cooperating with the rib to produce a reproduction of the transmitted copy, a synchronous motor for rotating the drum, means for receiving a signal corresponding to the desired speed of the motor, and an alternating current power supply for the motor including a vibrator coil, a synchronizing tube, means to apply said signal to the tube, and a transformer load impedance for the tube having a winding in series with the vibrator coil.

2. In a receiver for facsimile transmissions, the combination of a drum bearing a helical rib, a print bar cooperating with the rib to produce a reproduction of the transmitted copy, a synchronous motor for rotating the drum, means for receiving a signal corresponding to the desired speed of the motor, and an alternating current power supply for the motor including a vibrator coil, a synchronizing tube, an output transformer having a winding in the circuit of the tube, means to apply said signal to the tube, and a synchronizing transformer having a winding in the circuit of the tube and a second winding in series with the vibrator coil.

3. In a transmission system having a member at the receiver rotating in synchronism with a member at the transmitter, the combination of a synchronous motor for driving the member at the transmitter, a source of energy for driving said motor, means for transmitting a signal derived from said source, a synchronous motor for driving the member at the receiver, and a power supply for said last-mentioned motor including a vibrator coil, a synchronizing tube, receiving means to apply said signal to the tube, and a transformer having a winding in the circuit of the tube and a second winding in series with the vibrator coil.

4. In a transmission system having a member at the receiver rotating in synchronism with a member at the transmitter, the combination of a synchronous motor for driving the member at the transmitter, a source of energy for driving said motor, means for transmitting a signal derived from said source, a synchronous motor for driving the member at the receiver, and a power supply for said last-mentioned motor including a vibrator coil, a synchronizing tube, an output transformer having a winding in the circuit of the tube, receiving means to apply said signal to the tube, and a synchronizing transformer having a winding in the circuit of the tube and a second winding in series with the vibrator coil.

5. In a receiver for facsimile transmissions, the combination of a drum bearing a helical rib, a print bar cooperating with the rib to produce a reproduction of the transmitted copy, a synchronous motor for rotating the drum, means for receiving a signal corresponding to the desired speed of the motor, and an alternating current power supply for the motor including a vibrator having a natural frequency of vibration approximately equal to but differing from a value producing said speed, a coil for the vibrator, a synchronizing tube, means to apply said signal to the tube, and a transformer having a winding in the circuit of the tube and a second winding connected with the vibrator coil.

6. In a receiver for facsimile transmissions, the combination of a drum having a helical rib, a print bar cooperating with the rib to produce a reproduction of the transmitted copy, a synchronous motor for rotating the drum, means for receiving a signal corresponding to the desired speed of the motor, and an alternating current power supply for the motor including an output transformer, a synchronizing tube connected to receive its plate supply voltage from the output transformer and a grid signal from said receiving means, whereby the plate current of the tube is a function of the phase relation of the output voltage and the grid signal, a vibrator coil, and a synchronizing transformer having a winding in the circuit of the tube and a second winding connected with the vibrator coil.

7. In a transmission system having a member at the receiver rotating in synchronism with a member at the transmitter, the combination of a synchronous motor for driving the member at the transmitter, a source of energy for driving said motor, means for transmitting a signal derived from said source, a synchronous motor for driving the member at the receiver, and a power supply for said last-mentioned motor including a vibrator having a natural frequency of vibration approximately equal to but differing from said signal, a coil for the vibrator, a synchronizing tube, receiving means to apply said signal to the tube, and a transformer having a winding in the circuit of the tube and a second winding connected with the vibrator coil.

8. In a transmission system having a member at the receiver rotating in synchronism with a member at the transmitter, the combination of a synchronous motor for driving the member at the transmitter, a source of energy for driving said motor, means for transmitting a signal derived from said source, a synchronous motor for driving the member at the receiver, and a power supply for said last-mentioned motor including an output transformer, a synchronizing tube connected to receive its plate supply voltage from the output transformer, receiving means to apply said signal to the grid of the tube, whereby the plate current of the tube is a function of the phase relation of the output voltage and the grid signal, a vibrator coil, and a synchronizing transformer having a winding in the circuit of the tube and a second winding connected with the vibrator coil.

9. A controlled frequency power source including a vibrator having a coil, contacts actuated by the coil, and an output transformer, said contacts connecting a source of direct current with the coil and with a first winding of said transformer, a synchronizing tube, means to apply signals to the tube at a control frequency, a synchronizing transformer, and a series circuit connecting a second winding of the output transformer, the tube and a first winding of the synchronizing transformer, a second winding of the synchronizing transformer being connected with the vibrator coil.

10. A controlled frequency power source including a vibrator having a coil, contacts actuated by the coil, and an output transformer, said contacts connecting a source of direct current with the coil and with a first winding of said transformer, a synchronizing tube, means to apply signals to the tube at a control frequency, the vibrator having a natural frequency of vibration approximately equal to but differing from the control frequency, a synchronizing transformer, and a series circuit connecting a second winding of the output transformer, the tube and a first winding of the synchronizing transformer, a second winding of the synchronizing transformer being connected with the vibrator coil.

11. A controlled frequency power source including a vibrator having a coil, contacts actuated by the coil, and an output transformer, said contacts connecting a source of direct current with the coil and with a first winding of said transformer, a synchronizing tube, means to apply signals to a grid of the tube at a control frequency, a synchronizing transformer, and a series circuit connecting a second winding of the output transformer, the plate circuit of the tube and a first winding of the synchronizing transformer, whereby the plate current of the tube is a function of the phase relation of the output voltage and the grid signal, a second winding of the synchronizing transformer being connected with the vibrator coil.

References Cited in the file of this patent

UNITED STATES PATENTS

| Number | Name | Date |
|---|---|---|
| 2,326,740 | Artzt | Aug. 17, 1943 |
| 2,399,421 | Artzt | Apr. 30, 1946 |
| 2,512,647 | Hester | June 27, 1950 |
| 2,540,922 | Wickham | Feb. 6, 1951 |